Figure 1:
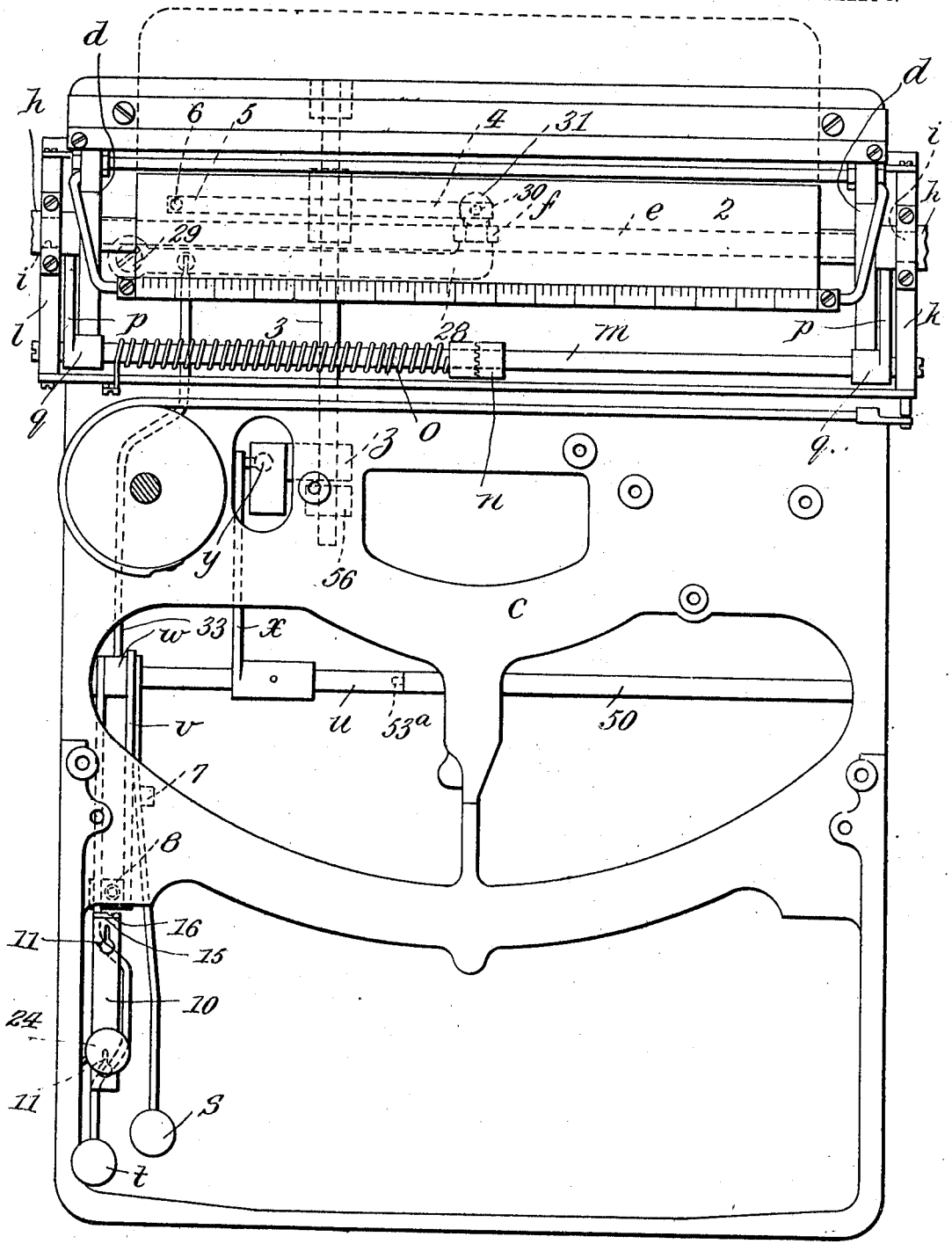

G. W. DAVIS.
SHIFT MECHANISM FOR TYPE WRITERS.
APPLICATION FILED JUNE 23, 1911.

1,054,396.

Patented Feb. 25, 1913.

4 SHEETS—SHEET 1.

G. W. DAVIS.
SHIFT MECHANISM FOR TYPE WRITERS.
APPLICATION FILED JUNE 23, 1911.
1,054,396.
Patented Feb. 25, 1913.
4 SHEETS—SHEET 2.
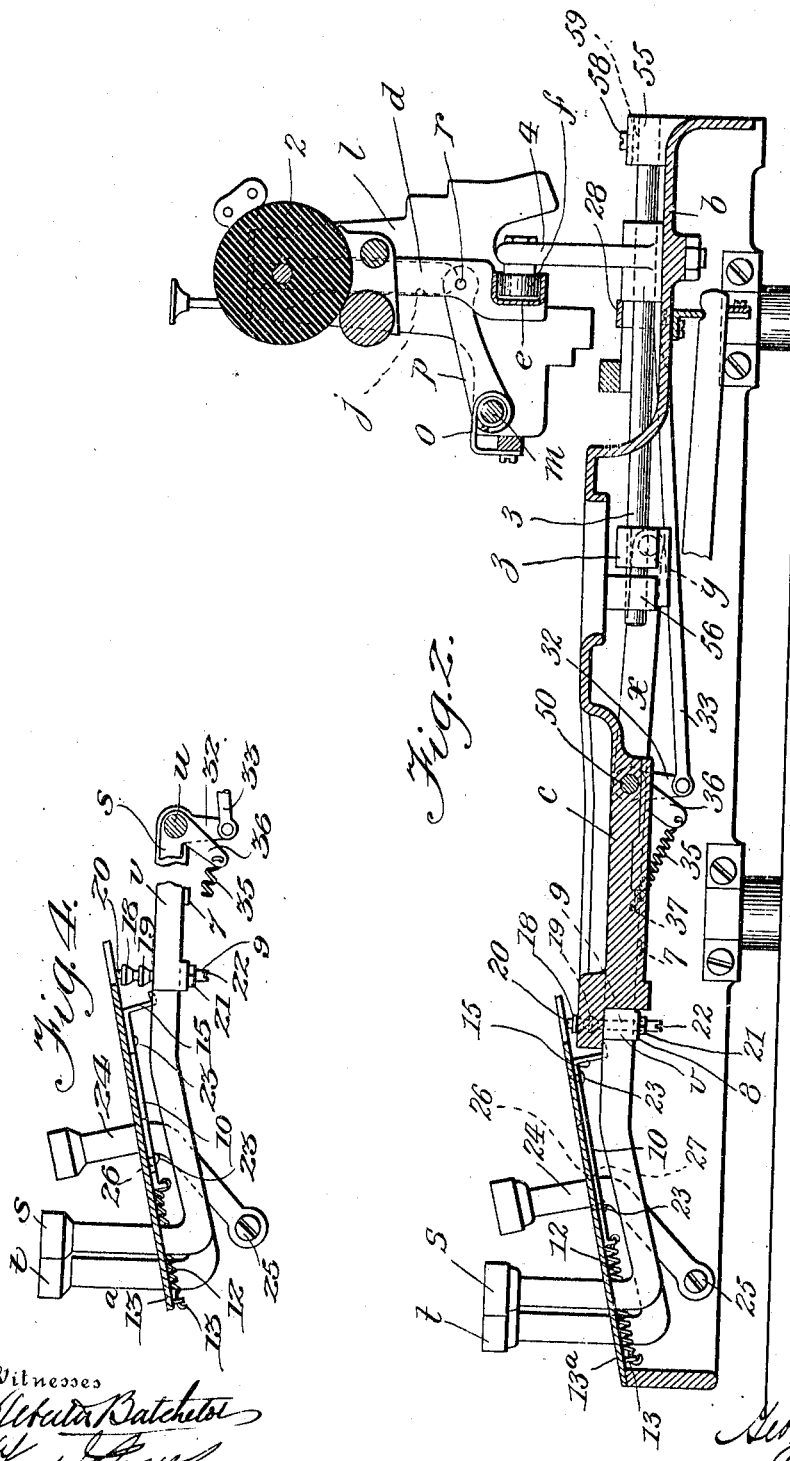

G. W. DAVIS.
SHIFT MECHANISM FOR TYPE WRITERS.
APPLICATION FILED JUNE 23, 1911.
1,054,396.
Patented Feb. 25, 1913.
4 SHEETS—SHEET 3.
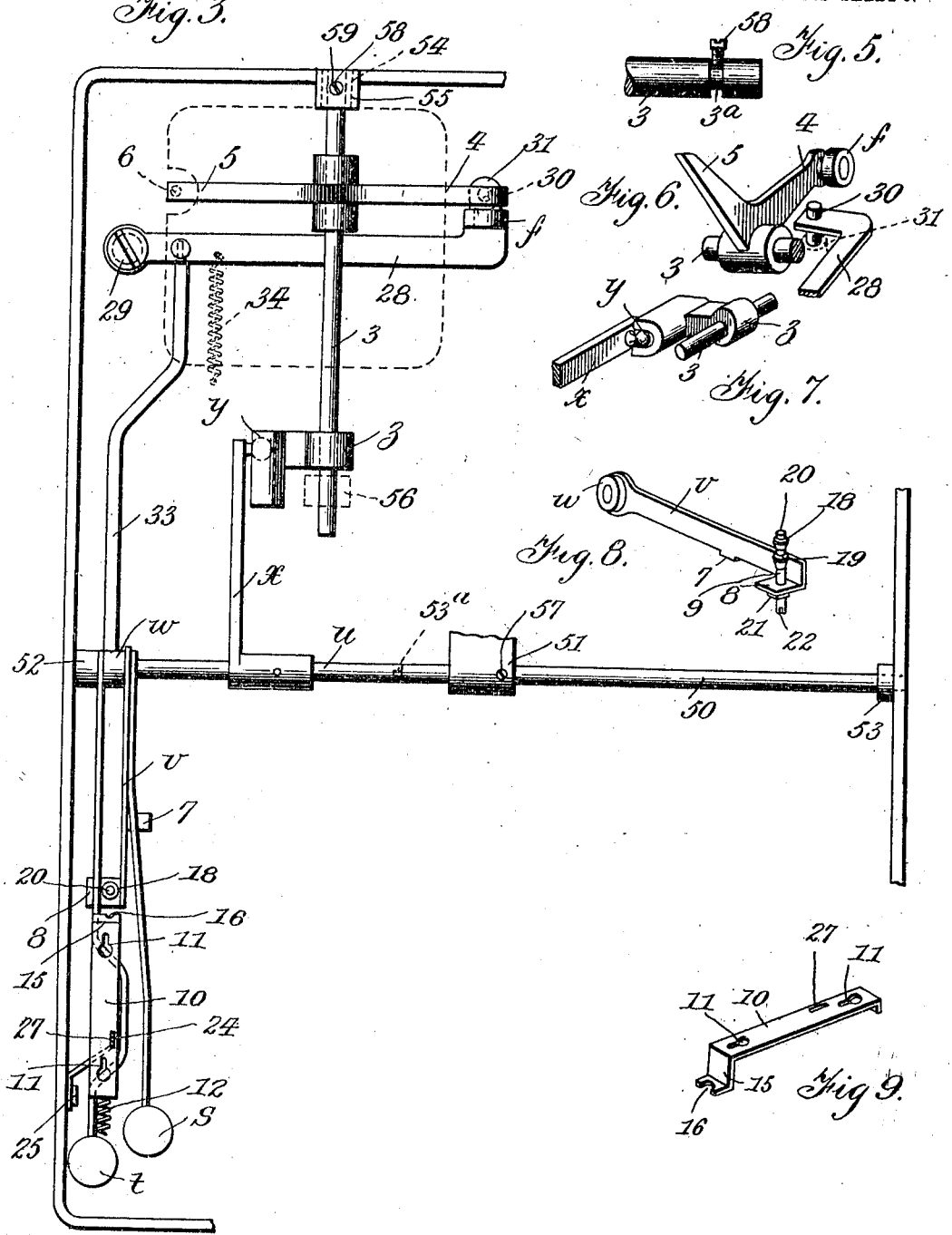

G. W. DAVIS.
SHIFT MECHANISM FOR TYPE WRITERS.
APPLICATION FILED JUNE 23, 1911.

1,054,396.

Patented Feb. 25, 1913.

4 SHEETS—SHEET 4.

UNITED STATES PATENT OFFICE.

GEORGE WILLIAM DAVIS, OF WESTMOUNT, QUEBEC, CANADA.

SHIFT MECHANISM FOR TYPE-WRITERS.

1,054,396.

Specification of Letters Patent.

Patented Feb. 25, 1913.

Original application filed January 3, 1907, Serial No. 350,637. Divided and this application filed June 23, 1911. Serial No. 634,953.

*To all whom it may concern:*

Be it known that I, GEORGE WILLIAM DAVIS, a subject of the King of Great Britain, of Westmount, in the district of Montreal, Province of Quebec, Canada, have invented certain new and useful Improvements in Shift Mechanism for Type-Writers; and I do hereby declare that the following is a full, clear, and exact description thereof.

The object of this invention is to provide novel shift devices, a lock therefor and a particular spring connection between certain of the parts whereby the shift keys are returned to their normal positions and yieldingly held there.

A further object of the invention is to provide a novel arrangement of the shift shafts to facilitate assembling and dismembering of the operating mechanism of the machine.

Figure 10:
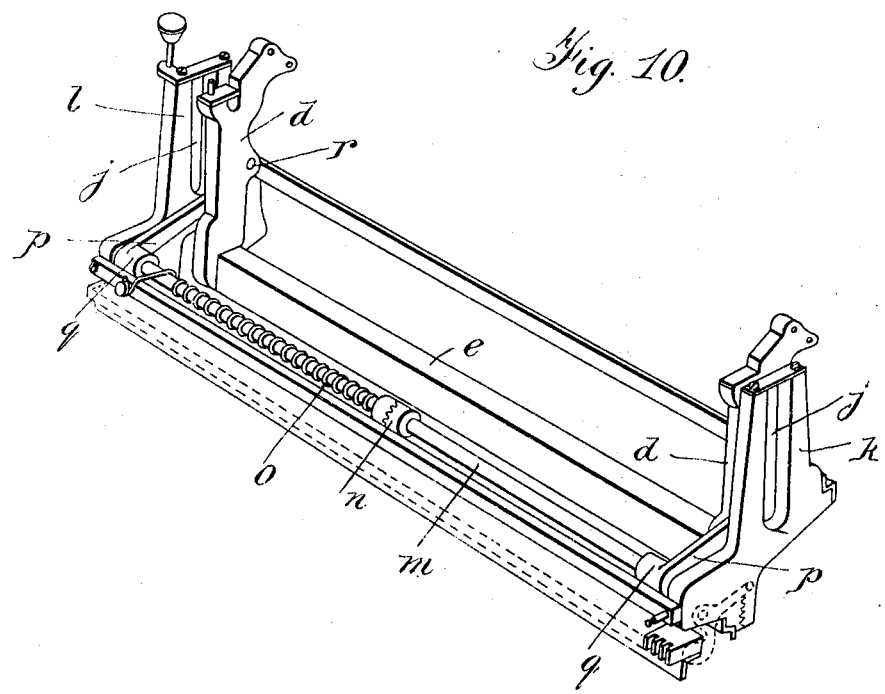

This invention is adapted to be applied to that type of writing machine illustrated in patent application Serial No. 350,637, filed January 3, 1907, of which this forms a divisional part. For full comprehension, however of my invention reference must be had to the accompanying drawings forming a part of this specification in which like reference characters indicate the same parts and wherein:

Figure 1 is a plan view of a typewriting machine with my improved shift mechanism applied thereto; Fig. 2 is a longitudinal vertical section thereof; Fig. 3 illustrates the shift mechanism in plan view and removed from the machine; Fig. 4 is a side elevation of the two shift keys and shift lock key with a portion of the means operatively connecting the same to the vibratory carriage; Fig. 5 is a detail view of the rear end of one of the shafts of the shift mechanism; Figs. 6, 7 and 8 are perspective views of portions of the shift mechanism; Fig. 9 is a perspective view of the shift lock bar which is mounted slidably upon the underside of the key-board cover plate; and Fig. 10 is a perspective view of the frames of the main and vibratory carriages.

The main frame of the machine presents portions $b$ and $c$ in different horizontal planes, the lowermost $b$ being at the rear and the upper $c$ at the middle of the machine.

The carriage consists of the main carriage frame and a vibratory carriage frame carried thereby; a platen roll 2 being mounted on the vibratory carriage; a portion of the tabulator mechanism and other parts in addition to the vibratory carriage are mounted on the main carriage frame but are not herein described or claimed as they form no part of the present invention.

The vibratory carriage (Fig. 10) consists of a pair of vertical end plates $d$ rigidly yoked together at their lower ends by a rearwardly facing bar $e$ of channel cross-section and constituting a rail in which the trundle roll $f$ (Fig. 2) of the carriage runs, the advantage of this arrangement (rearwardly facing) of the channel bar $e$ being that particles dropping from the ink ribbon, as it wears, will not lodge therein and clog the trundle roll. In order to constantly maintain the linear area (or in other words the area in which the line of writing is moved to use small type, capitals or figures and other characters) in the same vertical plane, the platen roll 2 which as above mentioned is mounted in the upper end of the vibratory carriage frame (in the same manner as it has been mounted heretofore in its carrier) has its trunnions $h$ flattened at each side as at $i$ and projected through vertical slots $j$ in the end plates $k$ and $l$ of the main carriage frame. The usual bar $m$, carrying the ratchets $n$, to one of which is connected the spring $o$ for yieldingly maintaining the platen carrier in its uppermost position, is carried by the carriage longitudinally thereof, and according to this invention has a pair of lever arms $p$ fixed rigidly at one end thereon as at $q$ and having their opposite ends pivotally connected as at $r$ to the lower parts of the end frame plates $d$ of the vibratory carriage. This vibratory carriage is depressed to two positions below its normal position (where it receives impressions from the small letters) in order to shift the platen to a position to either receive impressions from the capital letters or figures, by a pair of shift keys $s$ and $t$ (Figs. 1, 3 and 4) pivoted upon a rocker shaft $u$ (known as the shift-shaft) having an arm $v$ rigidly mounted thereon through a hub $w$ and another arm $x$ mounted rigidly upon the shaft $u$ is connected by a universal joint $y$ to an arm $z$ upon a second or counter rocker-shaft 3 which has a transverse double lever mounted rigidly thereon and carrying upon the end of one arm 4 the trundle roll $f$ adapted to engage in the channel bar $e$ while the end of its other arm 5 is adapted to bear upon an adjustable stop carried by the main frame and consisting of a screw 6. The arm $v$ has a lug 7 extending beneath the key $s$ and a second lug 8 projecting beneath the key $t$ while a lock bolt 9 constituting a portion of the shift key lock is carried by the lug 8. This shift key lock consists of a bar 10 (Figs. 3, 4 and 9) formed with a pair of key-hole slots 11 and having connected thereto at one end a retractile spring 12 fastened to a lug 13 struck down from the cover plate $13^a$ while its opposite end is offset as at 15 and notched as at 16 to engage the lock bolt 9 of the lever arm $v$. This lock-bolt has a pair of shoulders 18 and 19 and a diminished head 20 and it is threaded through the lateral projection 8 of lever $v$ and has a jam nut 21 thereon while its lower end is slotted as at 22 to receive a screw driver by which it is adjusted for initial fitting, the lock being held slidably upon the underside of the cover plate by a pair of studs 23.

An angular lever 24 is fulcrumed upon a screw-stud 25 threaded into a tapped perforation in the frame of the machine such lever projecting through registering slots 26 and 27 (Figs. 3 and 9) in the cover plate $13^a$ and in the lock. When writing capitals the shift key $s$ is depressed and if considerable writing is to be done in capitals, the lever 24 is depressed while the key $s$ is being held down, which has the effect of causing the notched offset 15 of the lock to engage the stud 9 and rest upon the shoulder 19 thereby holding the shift key $s$ and consequently the platen in the required position for the capitals. When it is desired to write figures, lever $t$ is depressed and the lock key 24 moved. The bar 10 will then engage the diminished head 20 and rest upon the shoulder 18. Upon again touching the key held depressed, the lock will be released and returned to its normal position by the spring 12. To cause the depression of the key $s$ to lower the vibratory carriage one-half the full extent (to receive impressions from the capital letters) a stop is usually provided, the construction and operation of which is a feature of this invention. To this end a bar 28 (Figs. 1, 3 and 6) is pivoted at one end as at 29 to the main frame and has its free end bent at right angles to its main length and provided with a short rigid standard 30 while an adjustable abutment in the form of a screw 31 is carried by the frame beneath such bent end, the said bent end being normally located in a position with the standard 30 beneath that end of the double lever which carries the trundle roll. This bar 28 is operatively connected to the key $t$ by means of a depending arm 32 (Fig. 4) upon such key $t$ and a rigid link 33 pivotally connected at one end to this arm 32 and at its other end to the bar 28 near its fulcrum point. A spring 34 (Fig. 3) connects the bar 28 to the frame of the machine and a spring 35 of less strength than the carriage balancing spring $o$ connects an extension 36 upon the lever $s$ to a hole 37 in the lever arm $v$. The spring 34 returns the bar 28 and, through rod 33, the shift key $t$ to its normal position; the spring $o$ through the intermediate mechanism, returns the lever arm $v$ and with it lever $t$ to their normal positions; and as the spring 35 has a tendency to draw the extension 36 of lever $s$ toward the arm $v$ it will constantly hold such lever $s$ in its normal (raised) position and the tension of this spring 35 is sufficient to retain the lever $s$ in its raised position even when the arm $v$ is depressed by lever $t$. The depression of key $t$ will lower the vibratory carriage and simultaneously displace the stop constituted by the standard 30 and allow the said vibratory carriage to be lowered to its full limit, the key $s$ not being operatively connected to the stop does not displace the same and its downward movement is consequently limited thereby.

In order to facilitate the assembling of the members of the shift mechanism the tabulator shaft 50 is made readily removable and one end thereof is utilized as a partial support for the said mechanism and to retain the same movably in place. To this end the tabulator or shaft 50 is made of sufficient length to project through bearing 51 an extent slightly greater than the length of the bearing 52 and such projecting end is formed with a tenon $53^a$ while the adjacent end of the shift shaft $u$ is bored axially to receive such tenon. The counter rocker shaft 3 (which receives its oscillatory motion from the shift shaft $u$) is adapted to be readily set in place with the arm $z$ and double lever 4 previously set forth thereon, by mounting the end thereof, toward the carriage, in a bushing 54 mounted in turn in a bearing 55 in the main frame while the opposite end thereof projects a short distance through the bearing 56. The first mentioned end of this countershaft 3 is formed with a circumferential groove $3^a$. To assemble these parts of the shift operating mechanism the shaft 50 is pushed from right to left through its bearings 53 until the tenon thereon is located within the bearing 51 there being sufficient space for shaft $u$ to be received between the bearings 51 and 52. Such shaft $u$ is then pushed into its bearings 52 until the hub $w$ stops it, and the shaft 50 is next moved until the tenon enters the hole in shaft $u$ thus supporting the latter rotatably in place. The screw 57 being tightened secures the shaft 50 against displacement. The end of shaft 3 (that end toward the carriage) is then entered from below and diagonally into the bearing 55 and pushed through the same until the opposite end can be inserted into bearing 56 which is then done and it is pushed through the latter until the groove 3ª comes into line with a tenoned retaining screw 58. The bushing is then put in place with a hole 59 therein also in line with the tenoned screw which is then tightened, thus completing the assembling of the shift operating mechanism.

Although I have illustrated and described the carriage construction, and carriage support, I do not herein claim the same as they form the subject matter of a separate application, filed Dec. 15, 1911, Serial No. 666,048.

What I claim is as follows:

1. In a typewriter, the combination with a vibratory carriage, of means for depressing the same to two positions, said means comprising a pair of shift keys fulcrumed coaxially, a depressible arm fulcrumed between and coaxially with the said keys and operatively connected to the vibratory carriage, a pair of lugs projecting from the arm beneath the respective keys, the said lugs being located at different distances from the fulcrum point of the bar, and a device for limiting the extent of the depression of the carriage, substantially as and for the purpose set forth.

2. In a typewriter, the combination with a vibratory carriage, of means for depressing the same to two positions, said means comprising a pair of shift keys fulcrumed coaxially, a depressible arm fulcrumed between and coaxially with the said keys and operatively connected to the vibratory carriage, a pair of lugs projecting from the arm beneath the respective keys, the said lugs being located at different distances from the fulcrum point of the arm, a yielding connection between one of the keys and the said arm whereby the key is returned to its normal raised position independently of the other key, and a device for limiting the extent of the depression of the carriage, substantially as described and for the purpose set forth.

3. In a typewriter, the combination with a vibratory carriage, of means for depressing the same to two positions, said means comprising a pair of fulcrumed shift keys, a depressible arm fulcrumed between the said keys and operatively connected to the vibratory carriage, and means adapted to connect the keys at different points respectively to the said arm and a device for limiting the extent of depression of the carriage, substantially as and for the purpose set forth.

4. In a typewriter, the combination with a vibratory carriage, of means for depressing the same to two positions, said means comprising a pair of fulcrumed shift keys, a depressible arm fulcrumed between the said keys and operatively connected to the vibratory carriage, means adapted to connect the keys at different points respectively to the said arm and a yielding connection between one of the keys and the said arm whereby the key is returned to its normal raised position independently of the other key and a device for limiting the extent of the depression of the carriage, substantially as, and for the purpose set forth.

5. In a typewriter, the combination with a vibratory carriage,—of a pair of independent keys, means operated by each of such keys for depressing the vibratory carriage, and a movable stop normally out of engagement with the said carriage depressing means and operated synchronously with one of the keys for increasing the extent of the said depression, substantially as described and for the purpose set forth.

6. In a typewriter, the combination with a vibratory carriage, of a pair of independent keys, means operated by either one of such keys for depressing the vibratory carriage, a bar normally out of engagement with the vibratory carriage, pivoted at one end and having its free end adapted to be swung to and from intersection of the vertical plane of the vibratory carriage while being depressed, and means operatively connecting one of the keys to the bar for the purpose of increasing the extent of the said depression, substantially as and for the purpose set forth.

7. In a typewriter, the combination with a vibratory carriage, of a pair of independent keys, means operated by either one of such keys for depressing the vibratory carriage, a bar pivoted at one end to a fixed part and having its free end adapted to be swung to and from intersection of the path of the vibratory carriage while being depressed, a yielding connection between the frame of the machine and the said bar, and means operatively connecting one of the keys to the bar for the purpose of increasing the extent of the said depression, substantially as described and for the purpose set forth.

8. In a typewriter, the combination with a vibratory carriage, having a channel bar e,—of a pair of keys s and t, rocker shaft u, arm v lugs 7 and 8, universal joint y, arm z, rocker shaft 3, double lever 4, trundle roll f, adjustable stop 6, bar 28, standard 30, adjustable abutment 31, depending arm 32, and rigid link 33, substantially as described and for the purpose set forth.

9. In a typewriting machine, the combination with a vibratory carriage, and a balance spring yieldingly supporting such vibratory carriage,—of a pair of levers, a lever arm coacting with the said levers, intermediate mechanism connecting the said lever arm to the vibratory carriage, and a retractile spring connecting the said lever arm to one of the said levers for yieldingly maintaining such lever in its normal position, substantially as and for the purpose set forth.

10. In a typewriter, the combination with a vibratory carriage having a channel bar $e$, of a pair of keys $s$ and $t$, rocker shaft $n$, arm $v$, lugs 7 and 8, universal joint $y$, arm $z$, rocker shaft 3, double lever 4, trundle roll $f$, stop 6, bar 28, standard 30, abutment 31, depending arm 32 and rigid link 33, substantially as described and for the purpose set forth.

11. In a typewriter, the combination with a vibratory carriage, of a pair of keys, means operated by either of such keys for depressing the vibratory carriage, a movable stop for increasing the depression of the vibratory carriage under the influence of one of the keys and means for locking the keys in their depressed position including a double stop, a slidable locking member, and a key adapted to slide such locking member into engagement with either one of the said stops, substantially as described.

12. In a typewriter, the combination with a vibratory carriage, of a pair of keys, means operated by such keys for depressing the vibratory carriage, a movable stop for increasing the depression of the vibratory carriage under the influence of one of the keys, a spring connecting the movable stop with the frame of the machine and adapted to return the stop and key to their normal positions, and means for locking the keys in their depressed position including a double stop, a slidable locking member and a key adapted to move such locking member into engagement with either one of the said stops, a downwardly extending arm upon the other key, and a spring connecting the depending arm to the locking member for the purpose of yieldingly maintaining such key in its normal position, substantially as described and for the purpose set forth.

13. A shift lock comprising in combination a shift shaft, a pair of depressible keys upon such shift shaft, an arm also upon the shift shaft, and adapted to be depressed by either of the said keys, a pair of vertically disposed stops carried by the arm, a slidable plate, a spring connected to its opposite end to the plate and to a stationary part, and a key adapted to move the slidable plate against the influence of the spring into engagement with either one of the said vertically disposed stops, substantially as described and for the purpose set forth.

14. A shift lock comprising in combination the bar 10, spring 12, lock bolt 9, with shoulders 18, 19, and head 20, lever arm $v$, and annular lever 24, substantially as described.

In testimony whereof, I have signed my name to this specification, in the presence of two subscribing witnesses.

GEORGE WILLIAM DAVIS.

Witnesses:
STANLEY C. KING,
FRED J. SEARS.

---

Copies of this patent may be obtained for five cents each, by addressing the "Commissioner of Patents, Washington, D. C."